(12) United States Patent
Li et al.

(10) Patent No.: US 12,054,651 B2
(45) Date of Patent: Aug. 6, 2024

(54) METHODS FOR ENHANCING THE BONDING STRENGTH OF THERMOSET ADHESIVES AND SEALANTS VIA DISULFIDE DYNAMIC CHEMISTRY

(71) Applicant: Northwestern University, Evanston, IL (US)

(72) Inventors: Lingqiao Li, Houston, TX (US); Xi Chen, Evanston, IL (US); John M. Torkelson, Skokie, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 18/186,574

(22) Filed: Mar. 20, 2023

(65) Prior Publication Data
US 2023/0227702 A1    Jul. 20, 2023

Related U.S. Application Data

(62) Division of application No. 16/911,943, filed on Jun. 25, 2020, now abandoned.

(60) Provisional application No. 62/867,537, filed on Jun. 27, 2019.

(51) Int. Cl.
C09J 165/02 (2006.01)
C08J 5/18 (2006.01)

(52) U.S. Cl.
CPC ............... *C09J 165/02* (2013.01); *C08J 5/18* (2013.01); *C08J 2365/02* (2013.01)

(58) Field of Classification Search
CPC ......... C09J 165/02; C08J 5/18; C08J 2365/02
See application file for complete search history.

(56) References Cited

U.S. PATENT DOCUMENTS

2007/0212551 A1* 9/2007 Collins ................. C09J 163/00
156/330
2013/0263888 A1* 10/2013 Kothandam ........... C09D 9/005
510/109

* cited by examiner

*Primary Examiner* — Shane Fang
(74) *Attorney, Agent, or Firm* — Bell & Manning, LLC

(57) ABSTRACT

Curable compositions for dynamic epoxy-based thermoset adhesives and/or sealants are provided. Methods of applying the compositions to form strong, low-stress, cured adhesive polymer films are also provided. The cured polymer films use crosslinkers that include disulfide and carbon-nitrogen bonds, wherein the disulfide bonds impart dynamic chemistry to the polymer network structure in order to the achieve adaptable thermoset adhesives and sealants.

21 Claims, 6 Drawing Sheets

Adaptive thermoset adhesives model system

Multi-functional epoxy
($M_n$ ~ 345 g/mol, Epo345)

+

Adaptive thermoset adhesives model system

Multi-functional epoxy
($M_n$ ~ 345 g/mol, Epo345)

+

Hexamethylenediamine
(HMDA)

METHODS FOR ENHANCING THE BONDING STRENGTH OF THERMOSET ADHESIVES AND SEALANTS VIA DISULFIDE DYNAMIC CHEMISTRY

CROSS-REFERENCE TO RELATED APPLICATIONS

The present application is a divisional application of U.S. patent application Ser. No. 16/911,943, filed Jun. 25, 2020, the entire contents of which are hereby incorporated by reference; which claims priority to U.S. provisional patent application No. 62/867,537 filed on Jun. 27, 2019, the entire contents of which are hereby incorporated by reference.

BACKGROUND

Adhesives play a critical role in a variety of applications where reliable bonding between objects or surfaces is required, e.g., automobiles, constructions, etc. Most adhesives with strong loading-bearing capabilities, e.g., acrylic or epoxy resins, rely on the process of cross-linking (or curing) to achieve excellent adhesive performance. Specifically, an uncross-linked and flowable adhesive mixture is typically applied to the substrate interfaces first to ensure sufficient surface wetting; the adhesive materials are then allowed to cure (under ambient conditions or through stimulus, e.g., heat or light) in order to form strong and intact bonding. However, during such cure processes, it is impractical to avoid all non-ideal conditions, e.g., preassembly reactions, trapped voids, and polymerization induced shrinkage, which could lead to the accumulation of internal stress and unsatisfactory surface wetting, resulting in severe and permanent detrimental effects on adhesive performance. In order to address these issues and improve adhesive performance, different strategies have been developed in previous studies, e.g., surface modification and incorporation of fillers. However, none of these measures adequately address all the issues that arise from the adhesive curing process, since such permanent cross-linking processes are typically not well-controlled.

Covalent adaptable networks or reprocessable polymer networks are cross-linked materials incorporated with covalent dynamic bonds. Their capability of reshaping covalently cross-linked materials post-polymerization via dynamic chemistry is potentially helpful for addressing the issue associated with traditional thermoset adhesive materials. After gelation, traditional thermoset adhesives can no longer alter their network structure and shape; thus, the voids and internal stresses built up during the cure process remain in the system and affect the long-term adhesive performances. In contrast, adhesives based on covalent adaptable network materials can change their shape upon stimulus, e.g., heat, to fill voids and release internal stresses generated during the curing process, leading to enhanced surface wettability and superior adhesive performances.

Only a few previous studies have employed covalent adaptable network materials in adhesive applications. Lafont and coworkers developed network materials containing disulfide dynamic bonds, which exhibit self-healing and repeated adhesion (the adhesive allows repeated debonding and re-adhesion cycles upon stimulus) behaviors. (Lafont, U. et al., *ACS Appl. Mater. Interfaces* 2012, 4, 6280-6288.) However, their study only achieved very limited lap shear strength (0.2 to 0.5 MPa). In later studies by Rowan and coworkers, network and network composite adhesives with disulfide dynamic bonds were reported to possess significantly higher lap shear strength (tens of MPa) with the repeated adhesion capability. (Michal, B. T. et al., *ACS Appl. Mater. Interfaces* 2016, 8, 11041-11049; and Cudjoe, E. et al., *ACS Appl. Mater. Interfaces* 2018, 10, 30723-30731.) They also found that the lap shear strength increased significantly after annealing at elevated temperature (150° C.), which was attributed to disulfide dynamic chemistry allowing the reshaping of the cured adhesives, thereby resulting in enhanced surface wetting and adhesive performance. However, their cross-linked adhesive materials require complicated synthesis involving organic solvents. More importantly, the resulting adhesive materials must be applied in their cross-linked solid state, that is, a "dry" adhesive, which severely limits applicability. Improved utility would involve designing adaptable network adhesives which could be easily synthesized and are compatible with most current applications, where adhesives are typically applied to the substrate in a flowable form and cured into network materials subsequently.

BRIEF DESCRIPTION OF THE DRAWINGS

Illustrative embodiments of the invention will hereafter be described with reference to the accompanying drawings.

SUMMARY

Figure 1:
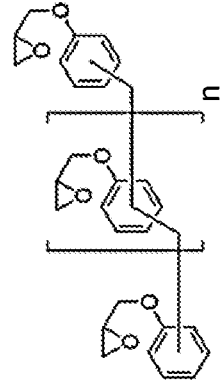
FIG. 1 shows formulations of model adaptive thermoset adhesives and the corresponding control system, a model adhesive that is permanently cross-linked.
Figure 1:
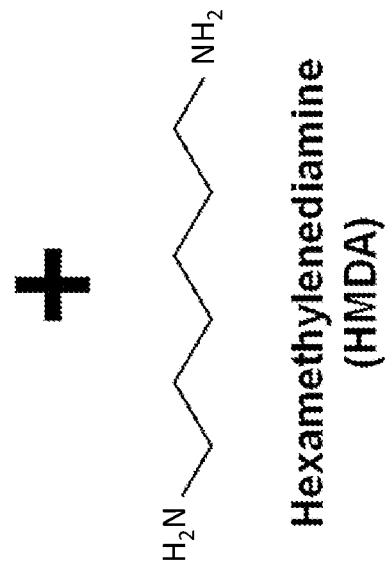
Figure 1:
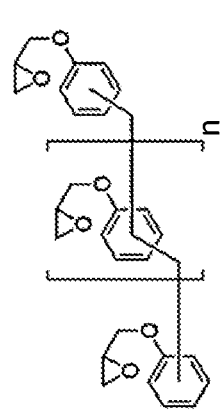
Figure 1:
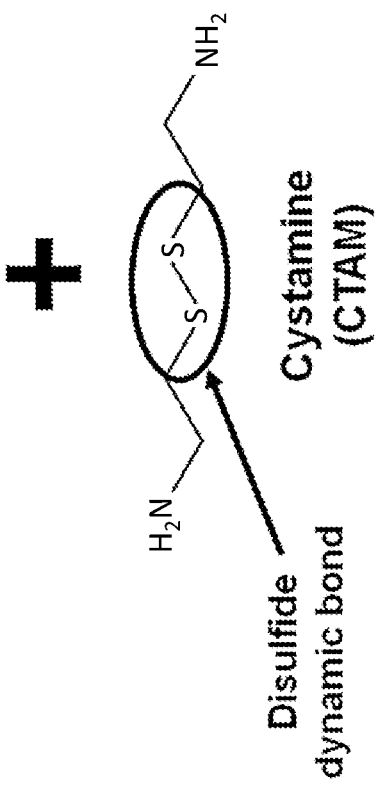

Adhesive compositions, films formed from the adhesive compositions, and methods of using the adhesive compositions are provided.

One embodiment of an adhesive composition includes an epoxidized phenol or cresol novalac resin, such as poly[(phenyl glycidyl ether)-co-formaldehyde] or poly[(o-cresyl glycidyl ether)-co-formaldehyde], and a crosslinker comprising at least two reactive amine groups and a disulfide bond.

One embodiment of a crosslinked polymer film is the product of crosslinking epoxy groups of an epoxidized phenol or cresol novalac resin, such as poly[(phenyl glycidyl ether)-co-formaldehyde] or poly[(o-cresyl glycidyl ether)-co-formaldehyde], with the reactive amine groups of a crosslinker comprising at least two reactive amine groups and a disulfide bond.

One embodiment of a method of forming a film on a substrate includes the steps of applying a composition comprising an epoxidized phenol or cresol novalac resin, a crosslinker comprising at least two reactive amine groups and a disulfide bond to a surface of the substrate; and annealing the applied composition at a temperature that induces epoxy groups of the epoxidized phenol or cresol to react with amine groups of the crosslinker to form a covalent bond and that further induces the cleavage and reformation of the disulfide bonds. If the film is utilized as an adhesive, a second substrate can be applied over the film during or after the annealing, wherein the film provides an adhesive bond between the two substrates.

DETAILED DESCRIPTION

Curable compositions for dynamic epoxy-based thermoset adhesives and/or sealants are provided. Methods of applying the compositions to form strong, low-stress, cured adhesive polymer films are also provided. The cured polymer films use crosslinkers with disulfide bonds that impart dynamic chemistry to the polymer network structure in order to achieve adaptable thermoset adhesives and sealants. The disulfide bonds in the resulting thermoset adhesives and sealants can be dynamically cleaved and reformed upon the application of heat and without the need for a catalyst. This allows the cured films to change their shape upon the application of the stimulus, even after an initial thermosetting. This enables the cured compositions to fill voids and release internal stresses generated during the curing process, leading to enhanced surface wettability and superior adhesive performances, relative to comparable cured films that lack the dynamic disulfide bonds.

The ability to dynamically change network structure and reshape post-polymerization is particularly effective in adapting adhesives to substrate surfaces, leading to significant enhancement in adhesive performance. This enhanced adhesive performance is reflected in the lap shear of the adhesives, which can be increased by a factor of two or higher relative to that of crosslinked epoxy-based adhesives that lack the dynamic disulfide bond in their crosslinks, but otherwise have the same structure.

The thermoset adhesive/sealant compositions are based on a simple chemistry, have the ability to be applied in a wet state and do not require organic solvents, and may be fabricated from readily available commercial materials. Illustrative applications for the thermoset adhesive include use as sealants and adhesives, including thermally responsive adhesives and/or sealants and detachable and/or re-applicable adhesives.

The curable compositions include an epoxy-functional molecule having at least two pendant epoxy groups and a crosslinker having at least one disulfide group in its backbone and at least two reactive amine groups. The epoxy groups on the epoxy-functional molecule can be terminal groups, pendant groups attached to a molecular backbone (e.g., an aliphatic or aromatic chain of carbon atoms), or a combination thereof. As used herein, the term reactive amine group refers to an amine group that is capable of reacting with the epoxy groups of the epoxy-functional molecule to form a covalent bond. The amines can be hydrazides. The reactive amine groups are desirably primary amine groups, each of which is capable of reacting with two epoxy groups. However, secondary amine groups can also be used. Within the compositions, the epoxy groups and amine groups are desirably, but not necessarily, present in stoichiometric quantities. Thus, the mole ratio of a crosslinker having reactive primary amine groups to the epoxy-functional molecules in some examples of the compositions will be 1:2. However, non-stoichiometric quantities can be used. For example, molar ratios of amine to epoxy in the range from 1:1.25 to 0.75:2 can be used.

Figure 5:
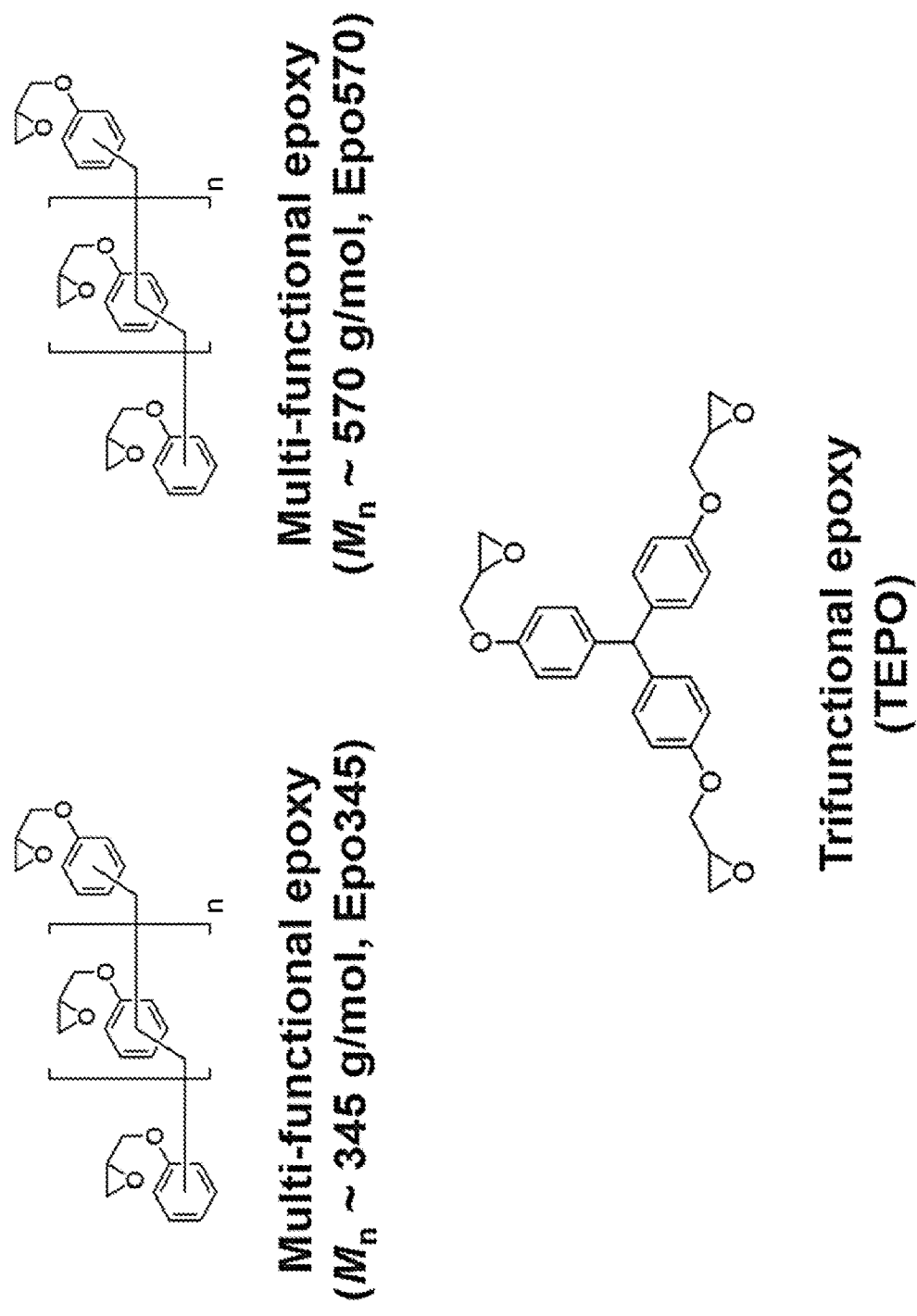
FIG. 5 shows the structures of monomers used for adhesive formulations.

Some examples of the curable compositions include at least one epoxidized phenol or cresol novalac resin as an epoxy-functional molecule. Some embodiments of the epoxidized phenol or cresol novalac resins have the structure:

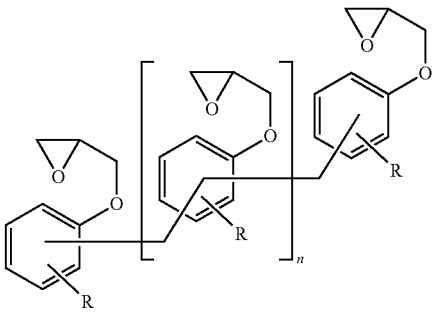

where R is H or $CH_3$ and n represents the number of repeat units in the polymer chain. Poly[(phenyl glycidyl ether)-co-formaldehyde] and/or poly[(o-cresyl glycidyl ether)-co-formaldehyde] are examples of suitable epoxidized phenol or cresol novalac resins. The structure of a poly[(phenyl glycidyl ether)-co-formaldehyde]s is shown in the two top panels of FIG. 5, where n represents the number of repeat units in the molecule. The number average molecular weight (Mn) of the epoxidized phenol or cresol novalac resins, including the poly[(phenyl glycidyl ether)-co-formaldehyde] and/or poly[(o-cresyl glycidyl ether)-co-formaldehyde], will depend on the number of repeat units in the molecules present. Typically, the poly[(phenyl glycidyl ether)-co-formaldehyde] and/or poly[(o-cresyl glycidyl ether)-co-formaldehyde] will have an Mn greater than 320 g/mol. This includes poly[(phenyl glycidyl ether)-co-formaldehyde]s and/or poly[(o-cresyl glycidyl ether)-co-formaldehyde] having Mn in range from 320 to 6000 g/mol. However, poly[(phenyl glycidyl ether)-co-formaldehyde] and/or poly[(o-cresyl glycidyl ether)-co-formaldehyde] having higher Mn values can also be used. The compositions can include a mixture of two or more poly[(phenyl glycidyl ether)-co-formaldehyde]s and/or poly[(o-cresyl glycidyl ether)-co-formaldehyde]s having different Mn values and/or can include other epoxy-functional molecules, such as tris (4-hydroxyphenyl)methane triglycidyl ether.

In some examples of the compositions, the amine-functional crosslinkers have the structure $H_2N$—X—S—S—X—$NH_2$ or $H_2NHNOC$—X—S—S—X—$CONHNH_2$, wherein X represents a linear or cyclic aliphatic or aromatic hydrocarbon group having from one to ten carbon atoms. Cystamine (FIG. 5, bottom panel) is a specific example of a diamine crosslinker that can be used.

When the compositions are cured, epoxy-amine crosslinking reactions take place to form polymer networks that include linkages with disulfide bonds and C—N bonds in the linkage backbone. For example, in a polymer network formed from a poly[(phenyl glycidyl ether)-co-formaldehyde] the benzene rings of the polyphenylene will be covalently linked by linkages containing disulfide groups. By way of further illustration, linkages formed by reacting a crosslinker with the structure $H_2N$—X—S—S—X—$NH_2$ with an epoxy group of a glycidyl ether would have the structure O—$CH_2$—(OH)CH—$CH_2$—HN—X—S—S—X—NH—$H_2$C—CH(OH)—$CH_2$—O—.

Optionally, filler particles, such as glass beads or fibers, ceramic particles, and/or carbon particles, such as graphite, can be added to the compositions. Typically, such filler will be present at concentrations of 10 wt. % or less (e.g., from about 0.1 wt. % to about 10 wt. %), based on the solids content of the cured film. Even in the presence of such fillers, polymer networks having improved performance can be formed, as illustrated in the Example.

The compositions are applied to a substrate surface and cured (i.e., crosslinked) to form a polymer film on the substrate. The curing may include two stages. In a first stage, the composition is maintained at a first temperature, or range of temperatures, for a first period of time to allow the crosslinking reactions between the epoxy-functional molecules and the amine crosslinkers to begin. This first temperature, or range of temperatures, may be below the glass transition temperature of the polymer when it is in its fully cured (i.e., fully crosslinked) state. In a second stage, the composition is annealed at a second temperature, or range of temperatures, for a second period of time to complete the curing of the polymer. The second temperature, or range of temperatures, is above the glass transition temperature for the polymer when it is in its fully cured state. At the second temperature, the disulfide bonds in the polymer are in a dynamic state in which they are cleaving and reforming, which provides the polymer with the ability to flow. As a result, the final cured film is adapted to the substrate surface, contains few or no voids, and is in a low- or no-stress state. In some embodiments of the methods, the first stage of curing is carried out at or near room temperature (e.g., at a temperature in the range from about 22° C. to about 25° C.) and the second stage of the curing is carried out at temperatures of 120° C. or higher (e.g., temperatures in the range from 120° C. to 200° C.). Typical periods of time for the first and second curing steps include periods of 12 hours to two days and 30 minutes to two hours, respectively. However, temperatures and times outside of these ranges can be used. A two-step cure is not required, however. The composition can be fully cured in a single annealing step.

If the composition is used as an adhesive to bond together two substrates, the annealing step can be carried out while the film is disposed between the two substrates being bonded. Examples of substrates that can be sealed or bonded using the compositions described herein include metal substrates, such as aluminum substrates, glass substrates, and plastic substrates.

The dynamic nature of the disulfide bond enhances the bonding properties of the cured polymer films, relative to analogous cured polymer films that do not include the disulfide bond, but otherwise have the same structure. Lap shear strength, which is a measure of how much shear force can be exerted on a bond before failure occurs, can be used to characterize the adhesive performance. Lap shear can be measured using the techniques described in the Example. Some examples of the cured thermoset adhesive films described herein have a lap shear strength that is at least 1.5 times the lap shear strength of their disulfide-bond-free counterparts. This includes embodiments of the cured thermoset adhesive films that have a lap shear strength that is at least twice the lap shear strength of their disulfide-bond-free counterparts.

EXAMPLE

This example illustrates a disulfide dynamic chemistry-based adaptive thermoset adhesive that can be easily synthesized by a one-step epoxy-amine reaction. (See FIG. 1.) The resulting thermoset adhesive materials contain disulfide dynamic bonds, which allow the change of network structure upon annealing post-polymerization. As a result, this adaptive thermoset adhesive is capable of filling voids and releasing internal stresses generated during the initial cure process, leading to enhanced adhesive performance. Specifically, the model adhesives described herein exhibited nearly a factor of 4 increase in lap shear strength after annealing at 160° C. for 1 h, in comparison with the corresponding as-cured samples. In contrast, a control group of adhesives synthesized with permanent cross-links only achieved less than a factor of 2 increase in lap shear strength under the same conditions. Such a sharp difference indicates that the disulfide dynamic chemistry plays a crucial role in enhancing adhesive performance. More importantly, the adaptive adhesives rely on commercially available materials. Additionally, the adaptive adhesives can be easily applied to the substrate in a flowable form and cured into network materials subsequently. In all, the effectiveness and simplicity of this strategy demonstrates that adaptive thermoset adhesives are useful as adhesives with enhanced adhesive performance.

Experimental

Materials. Cystamine dihydrochloride (96%), hexamethylenediamine (98%), poly[(phenyl glycidyl ether)-co-formaldehyde] ($M_n$~345 g/mol, EPO345; $M_n$~570 g/mol, EPO570), tris(4-hydroxyphenyl)methane triglycidyl ether (TEPO), glass spheres (9-13 microns), and sodium hydroxide (97%) were purchased from Sigma Aldrich.

Dichloromethane (DCM, certified ACS grade), ethanol (200 proof), and magnesium sulfate (anhydrous) were supplied by Fisher Scientific. All chemicals were used as received without further purification. Aluminum panels (1100 Aluminum, ⅛-inch-thick) for lap shear tests were purchased from McMaster Carr. These panels were cut into 1-inch by 4-inch pieces for lap shear sample preparation. All aluminum panels were washed by ethanol before use.

Synthesis of cystamine (CTAM). Cystamine dihydrochloride powder (20.0 g) was dissolved in deionized water (150 mL) with rigorous stirring. Sodium hydroxide pellets (20.0 g) were then added slowly into the cystamine dihydrochloride solution over the time frame of ~3 min. The resulting mixture was left stirring for 20 min at room temperature and then extracted with DCM (50 mL×4 times). The all organic phase was collected and combined before being dried over magnesium sulfate (~10.0 g) for 30 min with mild stirring. The slurry-like mixture was then filtered, and the liquid phase was concentrated in a rotary evaporator (Buchi) to yield relatively pure cystamine (liquid with slight yellow color). The cystamine product was stored in a freezer.

Synthesis of cured epoxy adhesives in bulk. Typically, stoichiometrically balanced amounts (amine to epoxy=1:2) of amine and epoxy were transferred into a Max10 mixing cup. The resulting mixture was then mixed three times by a speed mixer (Flacktek DAC 150.1 FVZ-K) at 3000 RPM for 5 min. The materials were left to cure at room temperature for 24 h.

Figure 2:
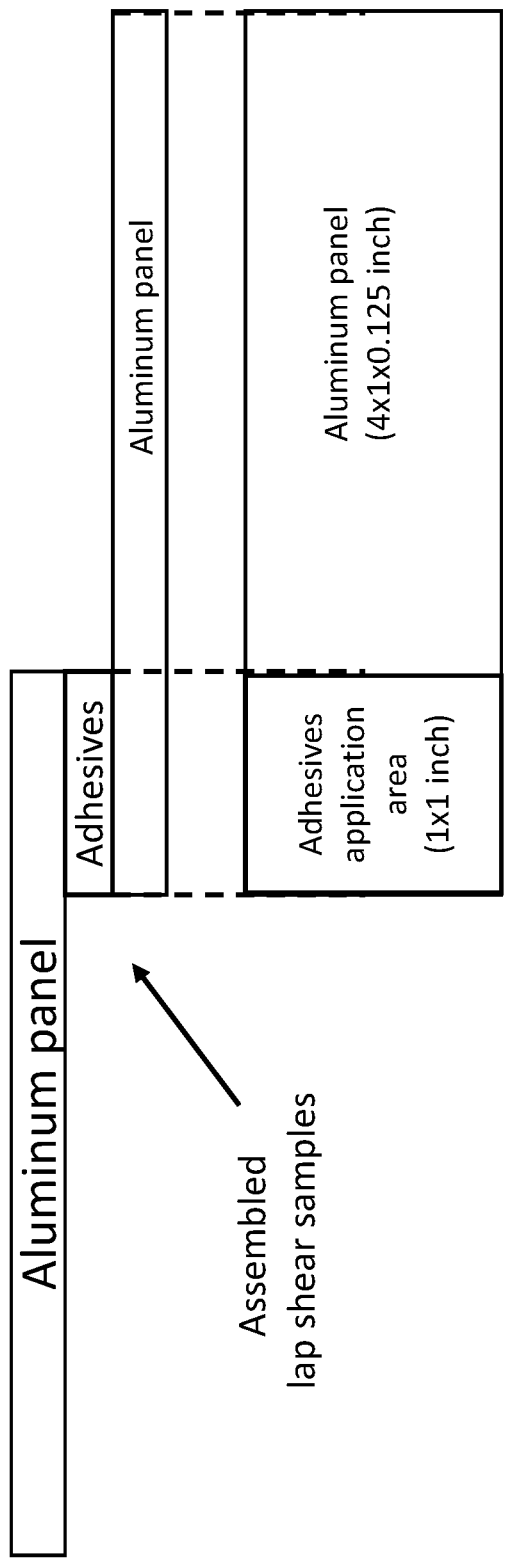
FIG. 2 shows the assembly of a typical lap shear test sample.

Preparation of lap-shear test samples. Typically, stoichiometrically balanced amounts (amine to epoxy=1:2) of amine and epoxy were transferred into a Max10 cup. The resulting mixture was then mixed three times by a speed mixer (Flacktek DAC 150.1 FVZ-K) at 3000 RPM for 5 min. The materials were then transferred into a 3 mL plastic syringe. As shown in FIG. 2, the adhesive mixture (~0.5 mL) was applied via a plastic syringe to a 1-inch by 1-inch area on an aluminum panel. Another clean aluminum panel was then combined to make a lap shear sample. Two paper clips (1-inch size) were used to fix the lap shear sample during the cure process. All lap shear samples were first cured at room temperature for 24 h. The resulting samples are referred to as "as-cured samples". Some of the as-cured samples were then annealed at 160° C. for 1 h to trigger the reshaping of the adhesives. The resulting samples are referred to as "annealed samples".

Lap shear test. Lap shear tests were used to characterize the adhesive performance of the adhesives. All measurements were carried out on a Sintech 20/G tensile tester equipped with 100 kN load cell in tension mode. The strain rate was fixed at 1 mm/min. The lap shear strength was calculated based on the peak stress over adhesion area (1-inch by 1-inch).

Dynamic mechanical analysis (DMA). DMA was used to characterize the thermal mechanical properties of the adhesives. The DMA samples were obtained by directly curing materials in a rectangular mold (~1 mm thickness). (The materials were mixed first in a Max10 cup as described in the section on synthesis of cured epoxy adhesives. The well-mixed materials were then poured into the rectangular mold and then cured by the same process as described in the section on synthesis of cured epoxy adhesives.) During measurements, the DMA was operated in oscillatory tension mode with a frequency of 1 Hz. The temperature ramp rate was 3° C./min.

Differential scanning calorimetry (DSC). DSC was used to characterize the glass transition temperatures ($T_g$s) of fully cured adhesive materials. The measurements were carried out as follows: samples were first annealed at 160° C. for 20 min and then quenched to 0° C. at a rate of 40° C./min; samples were then held at 0° C. for 2.5 min before ramping back to 160° C. at a rate of 10° C./min. The $T_g$s was determined using the half-$\Delta C_p$ method based on the curve obtained from the final heating ramp.

Results and Discussion

Figure 3:
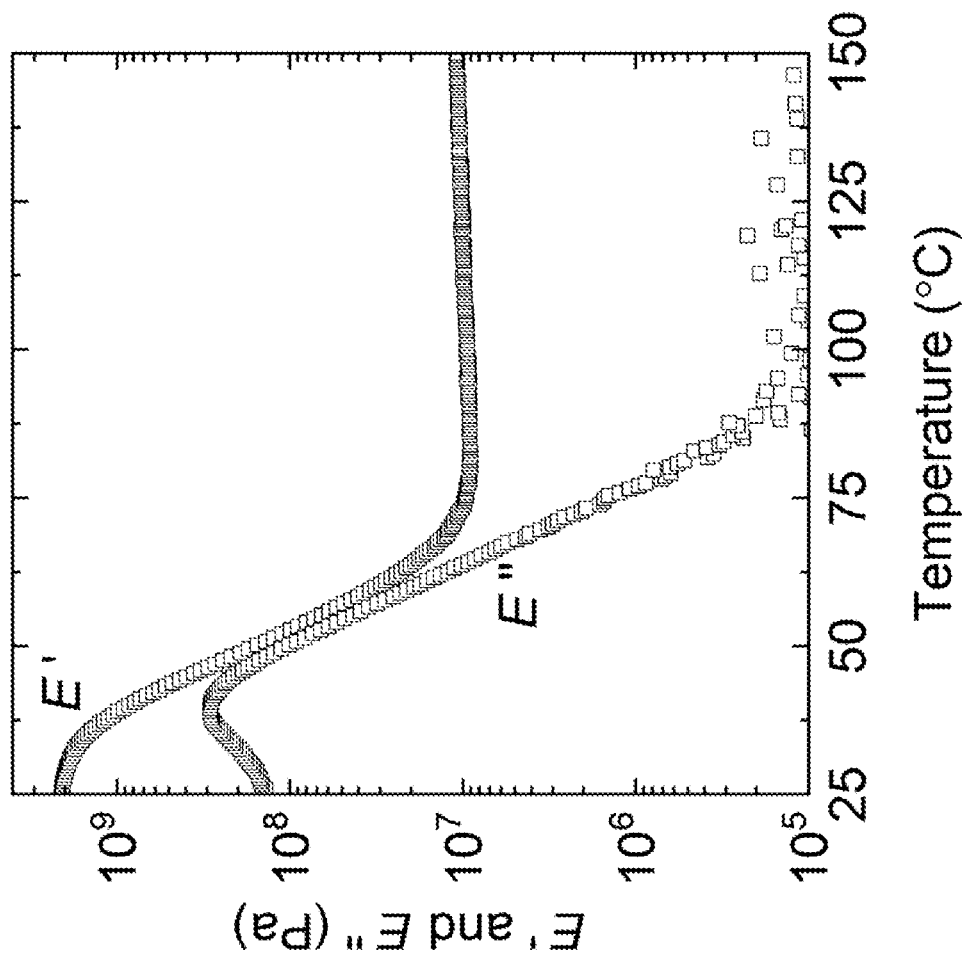
FIG. 3 shows tensile storage modulus (E') and tensile loss modulus (E") as functions of temperature for as-cured EPO345-CTAM materials.

To investigate the thermomechanical properties of the disulfide-based adaptive thermoset adhesive, bulk materials, EPO345-CTAM, were first synthesized by reacting EPO345 and CTAM as shown in FIG. 1 (left panel). The cross-linked nature of the resulting materials was confirmed by swelling tests: the as-synthesized materials exhibited swelling behavior in DCM. FIG. 3 shows tensile storage modulus (E') and tensile loss modulus (E") as functions of temperature for as-cured EPO345-CTAM materials. At temperatures above ~80° C., the existence of a rubbery plateau also indicates that EPO345-CTAM is a fully cross-linked material. Given that the rubbery plateau modulus can be directly related to cross-link density according to ideal rubber elasticity, the relatively high rubbery plateau modulus (~1.0*$10^7$ Pa at 140° C.), i.e., high cross-link density, is consistent with the fact that these materials are synthesized with short chains (each CTAM molecule contains only 7 inter-atom bonds in the backbone) between cross-links. (Flory, P. J., Cornell University Press, 1953.) These results indicate that the presence of disulfide dynamic chemistry does not interfere with the cross-linking of the adhesive materials. The temperature associated with the E" peak can be interpreted as a $T_g$; thus, the $T_g$ of as-cured EPO345-CTAM is 40° C. as shown in FIG. 3. (Menard, K. P., CRC Press, 2008.) Note that the thermomechanical properties as shown in FIG. 3 are directly related to the properties of the as-cured lap shear samples, which were made using the same conditions (room temperature for 24 h).

In order to provide a direct performance comparison for the disulfide-based adaptive thermoset adhesive, a control formulation, EPO345-HMDA, was also designed, which was synthesized by reacting EPO345 and HMDA as shown in FIG. 1 (right panel). The only difference between EPO345-HMDA and EPO345-CTAM formulations is that HMDA monomers do not contain any dynamic bonds; thus, the EPO345-HMDA network materials are considered to be permanently cross-linked and serve as an appropriate model system for traditional thermoset adhesives. From DSC measurements, the $T_g$ of annealed, completely cured EPO345-CTAM and EPO345-HMDA samples were determined to be 96° C. and 110° C., respectively. The lower $T_g$ value associated with EPO345-CTAM is due to the presence of disulfide bonds.

It is important to point out that the $T_g$ value for as-cured EPO345-CTAM obtained from FIG. 3, 40° C., is significantly lower than the high-conversion $T_g$ value associated with the annealed sample, 96° C. This is because the as-cured EPO345-CTAM was only exposed to room temperature; thus, the as-cured sample for DMA measurement was not fully reacted due to the glass transition. In contrast, annealed samples were held at 160° C. for a sufficiently long time to ensure full conversion, resulting in a $T_g$ increase relative to the as-cured samples. However, given that adhesive performances were evaluated by lap shear tests at room temperature, where all materials were in the glassy state and had similar tensile modulus (glassy polymeric materials generally exhibit a modulus on the order of 109 Pa), comparison between EPO345-CTAM and EPO345-HMDA as adhesives should make a fair evaluation of the effect of disulfide dynamic chemistry on the adhesive performance, i.e., the capability to reshape thermoset materials.

Figure 4:
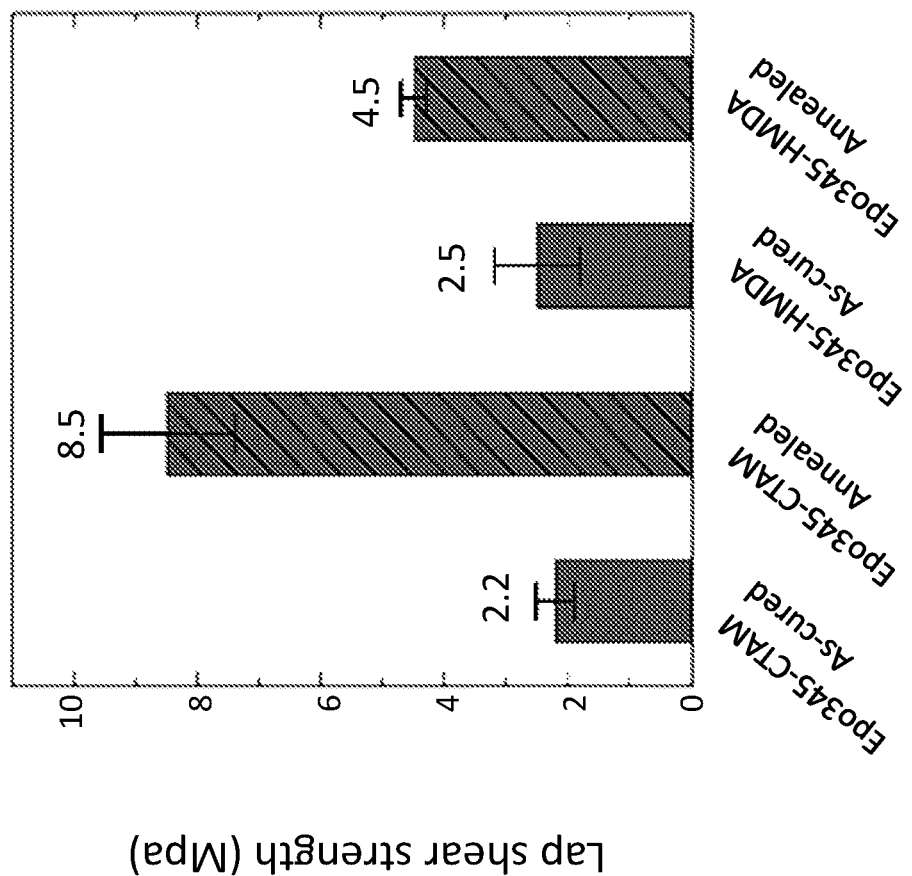
FIG. 4 shows lap shear strengths for EPO345-CTAM and EPO345-HMDA before and after annealing at 160° C.

For lap shear tests, freshly-made and uncured EPO345-CTAM and EPO345-HMDA adhesives were used to bond aluminum panels as shown in FIG. 2. The resulting samples were cured at room temperature for 24 h before performing the lap shear test. As shown in FIG. 4, as-cured EPO345-CTAM and EPO345-HMDA adhesives achieved lap shear strengths of 2.2±0.3 and 2.5±0.7 MPa, respectively, which are the same within experimental error. Such similar adhesive performance resulted from the following factors: 1) both EPO345-CTAM and EPO345-HMDA adhesives possess similar network structures and cross-link densities, given that the sizes of CTAM and HMDA molecules are comparable; 2) when cured at low temperatures, e.g., room temperature, the disulfide dynamic bonds are in dormant state rather than dynamic state; therefore, EPO345-CTAM networks act just like the EPO345-HMDA networks, the latter being a permanently cross-linked system. Note that the as-cured adhesive performances of both EPO345-CTAM and EPO345-HMDA systems also reflect any non-ideal conditions during the cure process of traditional thermoset adhesives, e.g., trapped voids and polymerization-induced shrinkage, since the disulfide dynamic chemistry is not yet actively involved.

To understand the effect of disulfide dynamic chemistry on the adhesive performance, the critical test involves investigating the lap shear strength of EPO345-CTAM adhesives after annealing at elevated temperatures, during which disulfide dynamic bonds would help reshape the thermoset adhesive to improve surface wettability. FIG. 4 shows the lap shear strengths measured from EPO345-CTAM and EPO345-HMDA adhesives after annealing at 160° C. for 1 h. In the case of EPO345-CTAM, the lap shear strength after annealing increased nearly 4 times that observed in the as-cured at room temperature samples. In contrast, for the EPO345-HMDA adhesives, the lap shear strength after annealing at 160° C. for 1 h increased less than a factor of 2. Consequently, in comparison with annealed EPO345-HMDA adhesives, which serve as the model system for traditional thermoset adhesives, the adhesive performance achieved by the annealed EPO345-CTAM adaptive thermoset adhesives is greater by a factor of 2 (within error). Given that EPO345-CTAM and EPO345-HMDA adhesives share similar network structures and exhibit comparable performance in as-cured samples, such a significant increase in the adhesive performance of EPO345-CTAM solely arises from the presence of the disulfide dynamic chemistry.

It is noteworthy that there are two factors contributing to the lap shear strength increase after annealing at 160° C. The first factor is the effect of post-curing. Both as-cured EPO345-CTAM and EPO345-HMDA adhesives are polymerized at room temperature, which is significantly lower than their high-conversion $T_g$s. As a result, these as-cured samples are not fully converted during the initial cure process due to the glass transition. The subsequent annealing at 160° C., which is higher than their high-conversion $T_g$s, assists in pushing the epoxy-amine reaction toward completion, leading to the enhancement of adhesive performance. This factor mostly accounts for the observation of strength increase in the EPO345-HMDA formulation, which is a permanently cross-linked material. The second factor only comes into play in the case of EPO345-CTAM adhesives, which contain disulfide dynamic bonds. During annealing at 160° C., the disulfide dynamic chemistry allows the relaxation and reshaping of the adhesive layer in between the aluminum substrate surfaces. Consequently, the trapped voids and internal stresses generated during initial curing process can be filled or relaxed, leading to enhanced surface wettability and long-term stability. In all, such capability of adapting to substrate surfaces via dynamic chemistry is the key that allows the EPO345-CTAM adhesives to significantly outperform the EPO345-HMDA adhesives.

Figure 6:
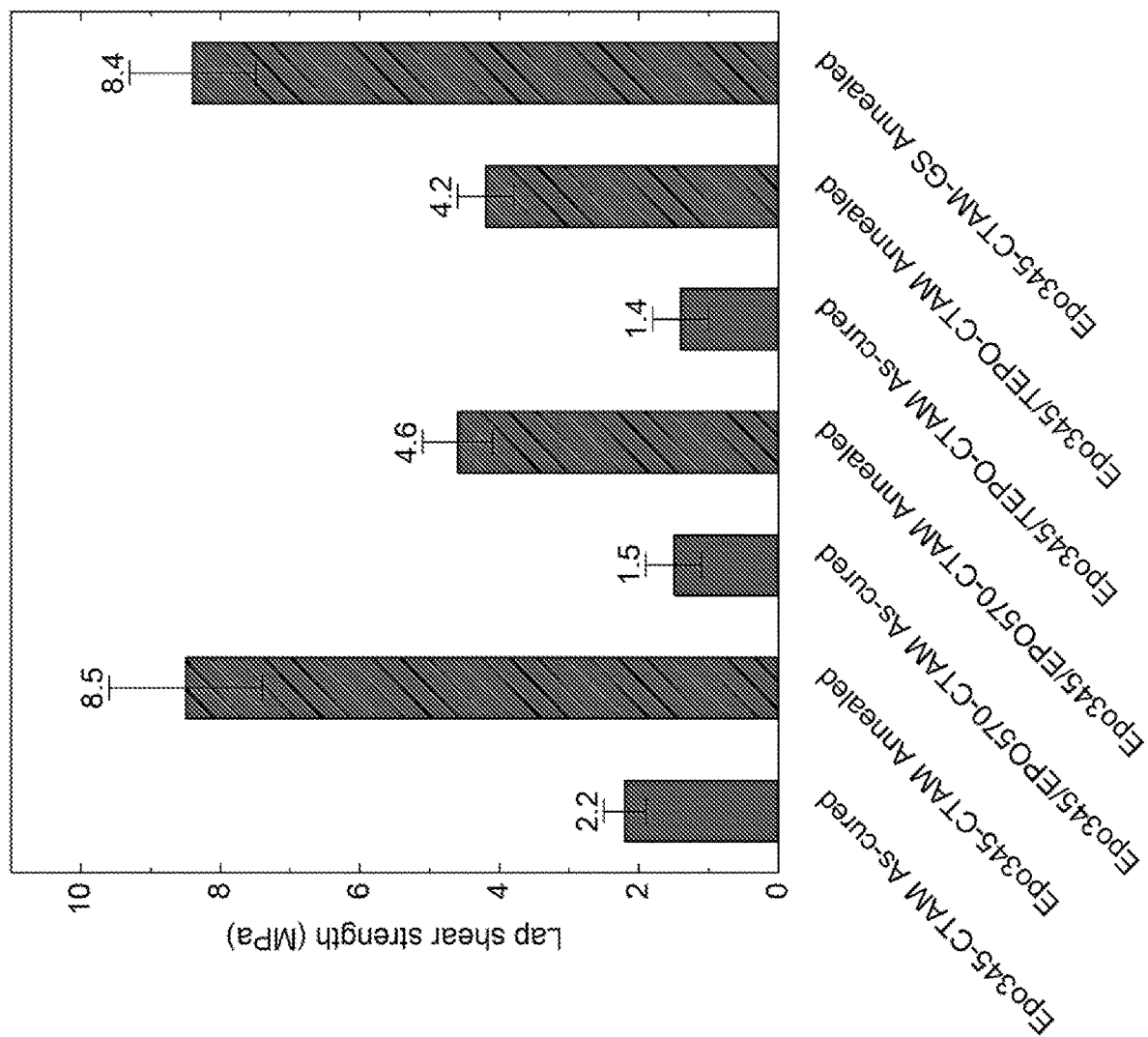
FIG. 6 shows lap shear strengths for EPO345-CTAM, EPO345/EPO570-CTAM, and EPO345/TEPO-CTAM before and after annealing at 160° C., as well as EPO345-CTAM-GS after annealing at 160° C.

Such performance enhancement resulting from dynamic chemistry is nearly independent of adhesive composition. FIG. 6 plots lap shear strengths measured from as-cured and annealed samples made with different formulations, including EPO345-CTAM, EPO345/EPO570-CTAM, and EPO345/TEPO-CTAM. (See FIG. 5 for different monomer structures.) Although different formulations lead to different absolute lap shear strengths as shown in FIG. 6, a consistent factor of 3 to 4 increase in lap shear strength was observed when going from the as-cured to annealed samples for each formulation. These results indicate that the adaptive capability associated with the disulfide dynamic chemistry is highly effective in promoting adhesive performance, regardless of the specific formulation. Additionally, given that traditional adhesive formulations often involve fillers, the EPO345-CTAM formulation was also tested with 6 wt. % glass spheres (9-13 microns, EPO345-CTAM-GS) as fillers. As shown in FIG. 6, the EPO345-CTAM-GS formulation with fillers achieved a lap shear strength that is within the same experimental error as the neat samples. In all, these results suggest that the adaptive thermoset adhesives can also work well with fillers in the adhesive formulation.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of bonding a first substrate to a second substrate, wherein the method is carried out with an adhesive composition without the use of organic solvents, the method comprising:
    applying the adhesive composition in a wet state to a surface of the first substrate, the adhesive composition comprising epoxy-functional molecules having at least two epoxy groups and crosslinkers comprising at least two reactive amine groups and a disulfide bond;
    curing the applied adhesive composition at a first temperature that induces epoxy groups of the epoxy-functional molecules to react with amine groups of the crosslinkers to form a crosslinked polymer film;
    before, during, or after the curing of the applied adhesive composition, applying the second substrate over the adhesive composition, such that the adhesive composition is between the first substrate and the second substrate; and
    annealing the crosslinked polymer film at a second temperature that is higher than the first temperature and that induces the cleavage and reformation of the disulfide bonds, wherein the annealing of the crosslinked polymer film takes place while the crosslinked polymer film is between the first substrate and the second substrate and forms an adhesive bond between the first substrate and the second substrate.

2. The method of claim 1, wherein the epoxy-functional molecules comprise epoxidized phenol or epoxidized novalac resins.

3. The method of claim 1, wherein the crosslinked polymer film comprises a crosslinked poly[(phenyl glycidyl ether)-co-formaldehyde].

4. The method of claim 1, wherein the crosslinked polymer film comprises a crosslinked poly[(o-cresyl glycidyl ether)-co-formaldehyde].

5. The method of claim 1, wherein the crosslinkers are cytamines.

6. The method of claim 1, wherein the adhesive composition has a mole ratio of amine groups to epoxy groups in the range from 1:1.25 to 0.75:2.

7. The method of claim 1, wherein the curing of the applied adhesive composition takes place at a temperature in the range from 22° C. to 25° C.

8. The method of claim 1, wherein the curing of the applied adhesive composition takes place for a period in the range from 12 hours to two days.

9. The method of claim 1, wherein the annealing of the crosslinked polymer film takes place at a temperature of at least 120° C.

10. The method of claim 9, wherein the annealing of the crosslinked polymer film takes place at a temperature in the range from 120° C. to 200° C.

11. The method of claim 9, wherein the annealing of the crosslinked polymer film takes place for a period in the range from 30 minutes to two hours.

12. The method of claim 1, wherein the first substrate and the second substrate are metal substrates, glass substrates, or plastic substrates.

13. The method of claim 1, wherein the adhesive composition has a mole ratio of amine groups to epoxy groups in the range from 1:1.25 to 0.75:2.

14. The method of claim 13, wherein the curing of the applied adhesive composition takes place at a temperature in the range from 22° C. to 25° C. and the annealing of the crosslinked polymer film takes place at a temperature of at least 120° C.

15. The method of claim 14, wherein the curing of the applied adhesive composition takes place for a period in the range from 12 hours to two days and the annealing of the crosslinked polymer film takes place for a period in the range from 30 minutes to two hours.

16. The method of claim 1, wherein the curing of the applied adhesive composition takes place at a temperature in the range from 22° C. to 25° C. and the annealing of the crosslinked polymer film takes place at a temperature of at least 120° C.

17. The method of claim 16, wherein the curing of the applied adhesive composition takes place for a period in the range from 12 hours to two days and the annealing of the crosslinked polymer film takes place for a period in the range from 30 minutes to two hours.

18. The method of claim 1, wherein the annealing of the crosslinked polymer film takes place without a catalyst.

19. The method of claim 1, wherein the crosslinkers have the structure $H_2N-X-S-S-X-NH_2$, wherein X represents an aliphatic or aromatic hydrocarbon group having from one to ten carbon atoms.

20. The method of claim 1, wherein the crosslinkers have the structure $H_2NHNOC-X-S-S-X-CONHNH_2$, wherein X represents an aliphatic or aromatic hydrocarbon group having from one to ten carbon atoms.

21. The method of claim 1, wherein the epoxy-functional molecules comprise epoxidized phenol or novalac resins and the crosslinkers have the structure $H_2N-X-S-S-X-NH_2$ or the structure $H_2NHNOC-X-S-S-X-CONHNH_2$, wherein X represents an aliphatic or aromatic hydrocarbon group having from one to ten carbon atoms.

* * * * *